(12) United States Patent
Araujo Da Silva et al.

(10) Patent No.: US 11,383,555 B2
(45) Date of Patent: Jul. 12, 2022

(54) COMPOSITE MATERIALS BASED ON ORIENTED ORTHOTROPIC FIBER MIXTURES FOR IMPARTING MECHANICAL COUPLING

(71) Applicant: COMPAGNIE GENERALE DES ETABLISSEMENTS MICHELIN, Clermont-Ferrand (FR)

(72) Inventors: Jose-Carlos Araujo Da Silva, Clermont-Ferrand (FR); Masayuki Maesaka, Clermont-Ferrand (FR); Philippe Mansuy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 916 days.

(21) Appl. No.: 16/065,287

(22) PCT Filed: Dec. 15, 2016

(86) PCT No.: PCT/FR2016/053444
§ 371 (c)(1),
(2) Date: Jun. 22, 2018

(87) PCT Pub. No.: WO2017/109336
PCT Pub. Date: Jun. 29, 2017

(65) Prior Publication Data
US 2021/0206203 A1 Jul. 8, 2021

(30) Foreign Application Priority Data

Dec. 22, 2015 (FR) ...................................... 1563038

(51) Int. Cl.
*B60C 1/00* (2006.01)
*B60C 11/00* (2006.01)
*C08L 7/00* (2006.01)
*B60C 11/14* (2006.01)

(52) U.S. Cl.
CPC ........ *B60C 1/0016* (2013.01); *B60C 11/0041* (2013.01); *C08L 7/00* (2013.01); *B60C 2011/0025* (2013.01); *B60C 2011/0033* (2013.01); *B60C 2011/145* (2013.01); *B60C 2200/065* (2013.01); *C08L 2205/16* (2013.01); *C08L 2207/04* (2013.01)

(58) Field of Classification Search
CPC .............. B60C 1/0016; B60C 11/0041; B60C 2011/0025; B60C 2011/0033; B60C 2011/145; B60C 2200/065; C08L 7/00; C08L 2205/16; C08L 2207/04
See application file for complete search history.

(56) References Cited

U.S. PATENT DOCUMENTS

| | | |
|---|---|---|
| 2,999,788 A | 9/1961 | Morgan |
| 3,767,756 A | 10/1973 | Blades |
| 3,869,429 A | 3/1975 | Blades |
| 3,869,430 A | 3/1975 | Blades |
| 6,610,261 B1 | 8/2003 | Custodero et al. |
| 6,696,153 B1 | 2/2004 | Joseph et al. |
| 6,747,087 B2 | 6/2004 | Custodero et al. |
| 7,250,463 B2 | 7/2007 | Durel et al. |
| 7,314,894 B2 | 1/2008 | Horiguchi et al. |
| 7,820,771 B2 | 10/2010 | Lapra et al. |
| 8,272,412 B2 | 9/2012 | Bergman et al. |
| 8,461,269 B2 | 6/2013 | Varagniat et al. |
| 8,757,233 B2 | 6/2014 | Merino Lopez et al. |
| 8,883,929 B2 | 11/2014 | Gandon-Pain et al. |
| 9,211,686 B2 | 12/2015 | Merino Lopez et al. |
| 9,822,244 B2 | 11/2017 | Joseph |
| 2004/0019135 A1 | 1/2004 | Horiguchi et al. |
| 2004/0144467 A1 | 7/2004 | Joseph et al. |
| 2005/0004297 A1 | 1/2005 | Durel et al. |
| 2006/0048874 A1 | 3/2006 | Maruoka |
| 2008/0132644 A1 | 6/2008 | Lapra et al. |
| 2008/0173381 A1 | 7/2008 | Joseph et al. |
| 2009/0133793 A1 | 5/2009 | Bergman et al. |
| 2009/0270558 A1 | 10/2009 | Gandon-pain et al. |
| 2010/0022714 A1 | 1/2010 | Varagniat et al. |
| 2010/0319827 A1* | 12/2010 | Imhoff .................... B29B 15/08 152/458 |
| 2011/0021702 A1 | 1/2011 | Gandon-Pain et al. |
| 2012/0208948 A1 | 8/2012 | Gandon-Pain et al. |
| 2012/0273109 A1 | 11/2012 | Merino Lopez et al. |
| 2012/0312439 A1 | 12/2012 | Bournat et al. |

(Continued)

FOREIGN PATENT DOCUMENTS

| | | |
|---|---|---|
| CN | 1473871 A | 2/2004 |
| EP | 0105822 A2 | 4/1984 |
| EP | 0581549 A1 | 2/1994 |
| EP | 1630003 A1 | 3/2006 |
| EP | 1982848 A1 | 10/2008 |
| FR | 2953456 A1 | 6/2011 |
| FR | 2953760 A1 | 6/2011 |

(Continued)

OTHER PUBLICATIONS

S. Brunauer et al., "Adsorption of Gases in Multimolecular Layers", J. Am. Chem. Soc., vol. 60, pp. 309-319 (1938).

(Continued)

*Primary Examiner* — Angela C Scott
(74) *Attorney, Agent, or Firm* — Venable LLP

(57) ABSTRACT

Materials make it possible to generate mechanical coupling in elastomeric compositions, of use especially for the manufacture of tyre treads. In particular, a tread comprises a composite material based on an elastomeric matrix, a cross-linking system, a reinforcing filler and oriented short fibres.

20 Claims, 2 Drawing Sheets

(56) References Cited

U.S. PATENT DOCUMENTS

| 2014/0174639 A1 | 6/2014 | Merino Lopez et al. |
| 2014/0221557 A1 | 8/2014 | Joseph |

FOREIGN PATENT DOCUMENTS

| WO | 97/36724 A2 | 10/1997 |
| WO | 99/16600 A1 | 4/1999 |
| WO | 01/57116 A1 | 8/2001 |
| WO | 03/016387 A1 | 2/2003 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2008/027045 A1 | 3/2008 |
| WO | 2013/041400 A1 | 3/2013 |

OTHER PUBLICATIONS

International Search Report dated Mar. 29, 2017, in corresponding PCT/FR2016/053444 (4 pages).
U. Him, et al., "A Review of Image Analysis Based Methods to Evaluate Fiber Properties", Lenzinger Berichte 86 (2006) 96-105.
C.L. Tucker III, et al., "Stiffness predictions for unidirectional short-fiber composites: Review and evaluation", Composites Science and Technology 59 (1999) 655-671.

* cited by examiner

COMPOSITE MATERIALS BASED ON ORIENTED ORTHOTROPIC FIBER MIXTURES FOR IMPARTING MECHANICAL COUPLING

TECHNICAL FIELD

The present invention relates to materials making it possible to generate mechanical coupling in elastomeric compositions, of use especially for the manufacture of tyre treads.

STATE OF THE ART

Improving the wear resistance of tyres is a highly important issue, especially due to the cost of tyres. This issue concerns all types of tyre, but is even more important for tyres for heavy-duty vehicles and civil engineering vehicles, due to the economic impact associated with the immobilization of the vehicles while the worn tyres are replaced.

Particularly in the field of civil engineering, and in particular in the mining sector, tyres are essentially used on ore or coal extraction sites, and also in quarries. In a simplified way, usage consists of:

a loaded outward cycle, generally uphill for ore and coal, generally downhill for quarries, for transporting the ore or spoil to unloading zones ("crusher" for ore, "dumping zones" for spoil);

an empty return cycle, generally downhill for mining use, generally uphill for quarry use, to return to the loading zones.

The tyres fitted to the mining dumpers in question are, as a general rule, fitted on the front axle of the vehicle for the first third of their life, then changed around and fitted as part of a twinned pair to the rear axle for the remaining two thirds of their life. The driving torque is transmitted via the rear axle, and the braking torque is also virtually exclusively transmitted via the rear axle, using engine braking (thermal or electrical in the case of a transmission of this kind).

From the mine manager's perspective, the transport of ore and of spoil represents a significant share of the mine's operating costs, and within this contribution, the share represented by tyres is significant. Limiting the rate of wear is therefore a key contributor to reducing the operating costs. From the tyre manufacturer's perspective, developing technical solutions that make it possible to reduce the rate of wear is therefore an important element of strategy.

Mining tyres of the rear axle of rigid dumpers are subject to high forces (passage of driving torque and braking torque) since the slopes of the tracks for exiting open-pit mines are generally of the order of 8.5 to 10%. This slope value makes it possible to optimize the productivity of the vehicles with the currently available powers. These stresses are reflected in relatively rapid tyre wear. It is therefore a question of proposing a technical solution that makes it possible to improve the wear performance of the tyres on this axle, both under loaded driving torque and under empty braking torque.

Numerous solutions have been researched for increasing the wear resistance so as to prolong their service life as much as possible and thereby reduce the operating costs.

In the field of tyres for civil engineering vehicles, it is known to use natural rubber, a reinforcing filler of carbon black type and additives customarily used for these tyres, in treads for off-road vehicles. The wear resistance of this type of tyre is generally improved by optimizing the nature of its constituents or of its tread patterns. For example, in order to improve the wear resistance of off-road tyres, application WO 2013/041400 proposes integrating a certain amount of polybutadiene with a high vinyl content into an isoprene matrix of a tread composition.

In the field of tyres for vehicles running on a bituminous surface, such as passenger vehicles or the majority of heavy-duty vehicles, a solution for improving wear resistance was proposed in U.S. Pat. No. 8,272,412 by integrating, into an elastomer tread composition, glass fibres oriented at 45 degrees relative to the running direction in the circumferential plane.

Yet, it is still necessary to provide improved solutions for improving the wear resistance of tyres in general, and particularly for tyres for heavy-duty vehicles or civil engineering vehicles.

SUMMARY OF THE INVENTION

Consequently, the present invention relates to a novel formulation for tyres, making it possible to significantly improve their wear resistance.

The subject of the present invention is especially a tread comprising a tread pattern, said tread pattern comprising a composite material based on an elastomeric matrix, a crosslinking system, a reinforcing filler and short fibres, said short fibres:

having a thickness within a range extending from 5 to 40 µm, a length within a range extending from 0.5 to 10 mm and a Young's modulus, the value of which is within a range extending from 0.5 to 800 GPa, being present in the elastomeric matrix at a concentration within a range extending from 5 to 30 parts by weight per hundred parts by weight of elastomer, phr, and being oriented in circumferential planes according to the same angle $\alpha$ expressed in degrees relative to the radial plane, the angle $\alpha$ being defined by the formula $\alpha = 45 +/- x$, in which x is within a range extending from 10 to 30.

The tread in accordance with the invention may either be in the uncured state (before crosslinking or vulcanization) or in the cured state (after crosslinking or vulcanization). It may be in the form of a semi-finished product which may be used in a tyre or on a retreaded carcass, or else be already arranged on a tyre or tyre casing.

DETAILED DESCRIPTION OF THE INVENTION

Definitions

The expression "part by weight per hundred parts by weight of elastomer" (or phr) should be understood as meaning, for the purposes of the present invention, the share by weight per hundred parts by weight of elastomer or rubber.

In the present document, unless expressly indicated otherwise, all the percentages (%) shown are percentages (%) by weight.

Furthermore, any range of values denoted by the expression "between a and b" represents the range of values extending from more than a to less than b (that is to say, limits a and b excluded), while any range of values denoted by the expression "from a to b" means the range of values extending from a up to b (that is to say, including the strict limits a and b). In the present document, when a range of values is denoted by the expression "from a to b", the range represented by the expression "between a and b" is also and preferentially denoted.

In the present document, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof. By way of example, a composition based on an elastomeric matrix and on sulfur comprises the elastomeric matrix and the sulfur before curing, whereas, after curing, the sulfur is no longer detectable as the latter has reacted with the elastomeric matrix with the formation of disulfide bridges.

In the present document, the expression "predominantly comprises" is understood to mean comprises more than 50%. This may, for example, be more than 60%, 70%, 80%, 90%, or even 100%.

At a given point on a tyre, the circumferential direction, also referred to as the longitudinal direction, is the direction tangent to a circle centred on the axis of rotation of the tyre. It is parallel to the running direction of the tyre. The axis of rotation of the tyre is the axis about which it turns in normal use. At a given point on a tyre, the transverse direction, also referred to as the lateral direction, is parallel to the axis of rotation of the tyre. At a given point on a tyre, the radial direction is a direction that intersects the axis of rotation of the tyre and is perpendicular thereto. "X" is a direction parallel to the circumferential direction, "Y" is a direction parallel to the transverse direction, and "Z" is a direction parallel to the radial direction. The directions XYZ form an orthogonal frame of reference (FIG. 1).

"Fx" is intended to mean the horizontal component of the ground forces on the tyre in the running direction of the tyre. Reference is made to driving torque when a positive force Fx is applied, and braking torque when a negative force Fx is applied. "Fy" is intended to mean the horizontal component of the ground forces on the tyre in the transverse direction of the tyre. "Fz" is the vertical component.

"Level of coupling" is intended to mean the ratio of the horizontal component Fx of the ground forces on the tyre (or ground forces on the test specimen) to the vertical component Fz of the ground forces on the tyre (or ground forces on the test specimen).

A radial plane "YZ", also referred to as meridian plane, is a plane which contains the axis of rotation of the tyre. A circumferential plane "XZ" is a plane perpendicular to the axis of rotation of the tyre. The circumferential median plane, also referred to as the equatorial plane, is a plane which is perpendicular to the axis of rotation of the tyre and which divides the tyre into two halves.

In the present document, "tread pattern" is intended to mean a more or less complex system of elements in relief, separated from one another by cutouts. The elements in relief of a tread pattern may be ribs or tread blocks.

"Rib" is intended to mean an element in relief formed on a tread and extending essentially along the circumferential direction, this element being delimited either by two cutouts or by a cutout and an edge of the tread. A rib comprises two lateral walls and a contact face, the latter being intended to come into contact with the road surface during running. This element extends in the circumferential direction and encircles the tyre (legend (2) of FIG. 1).

"Tread block" is intended to mean an element in relief formed on a tread, this element being delimited by one or more rectilinear, curved or circular cutouts, and optionally by an edge of the tread. A tread block also comprises a contact face, the latter being intended to come into contact with the road surface during running (legend (3) of FIG. 1).

The cutouts may either be grooves or sipes, depending on their thickness, that is to say the distance between the walls of material delimiting them, and their function during running. The thickness of a groove is typically at least equal to 1 mm, whereas the thickness of a sipe is typically at most equal to 1 mm. When the tyre is running, the walls of material of a groove do not come into contact with one another, whereas the walls of material of a sipe at least partially come into contact with one another.

In the present document, a "cutout" denotes a groove and corresponds to the space delimited by walls of material facing one another and spaced apart from one another by a non-zero distance, preferably a distance greater than 1 mm, for example greater than 2, 3, 4 or 5 mm (legends (4) and (5) of FIG. 1).

According to the invention, "composite material" is intended to mean any material based on at least one elastomeric matrix, a crosslinking system, a reinforcing filler and short fibres.

Within the context of the invention, the carbon-based products mentioned in the description may be of fossil or biobased origin. In the latter case, they may partially or completely result from biomass or be obtained from renewable starting materials resulting from biomass.

Elastomeric Matrix

According to the invention, any elastomeric matrix known to those skilled in the art for the manufacture of treads may be used in the composite material of the tread pattern of the tread according to the invention.

For example, the elastomeric matrix may comprise a diene elastomer, preferably an elastomer selected from isoprene elastomers, butadiene and styrene copolymers, polybutadienes and mixtures thereof.

The term "diene elastomer" should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These diene elastomers are well known to those skilled in the art and can be classified into two categories: "essentially unsaturated" or "essentially saturated". "Essentially unsaturated" is generally intended to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and may especially be termed "essentially saturated" diene elastomers (low or very low content, always less than 15%, of units of diene origin). In the category of "essentially unsaturated" diene elastomers, "highly unsaturated" diene elastomer is intended in particular to mean a diene elastomer having a content of units of diene origin (conjugated dienes) which is greater than 50%.

Diene elastomer capable of being used in the compositions in accordance with the invention is intended more particularly to mean:

a) any homopolymer of a conjugated diene monomer, especially any homopolymer obtained by polymerization of a conjugated diene monomer having from 4 to 12 carbon atoms;

b) any copolymer obtained by copolymerization of one or more conjugated dienes with one another or with one or more vinylaromatic compounds having from 8 to 20 carbon atoms;
c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;
d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the type (a) or (b) above. In the case of copolymers of the type (b), the latter contain from 20% to 99% by weight of diene units and from 1% to 80% by weight of vinylaromatic units.

The following are especially suitable as conjugated dienes: 1,3-butadiene, 2-methyl-1,3-butadiene, alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

"Isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene, preferably natural rubber. For example, the synthetic polyisoprene can be a polyisoprene having a content (mol %) of cis-1,4-bonds of greater than 90%, more preferentially still of greater than 98%.

The elastomers used in the context of the present invention can, for example, be block, random, sequential or microsequential elastomers and can be prepared in dispersion or in solution; they can be coupled and/or star-branched and/or functionalized with a coupling and/or star-branching and/or functionalization agent.

The isoprene elastomer can be selected from the group consisting of natural rubber, synthetic polyisoprene and their mixture. Preferably, the isoprene elastomer is natural rubber.

For the purposes of the present invention, copolymer of butadiene units and of styrene units refers to any copolymer obtained by copolymerization of one or more butadiene(s) with one or more styrene compounds. The following, for example, are suitable as styrene compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene. These elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution.

The butadiene and styrene copolymer can, for example, be butadiene/styrene copolymer (SBR). It can, for example, be an SBR prepared in emulsion ("ESBR") or an SBR prepared in solution ("SSBR"). The contents of vinyl (1,2-), trans-1,4- and cis-1,4-bonds of the butadiene part of the SBR can be variable. For example, the vinyl content can be between 15% and 80% (mol %) and the content of trans-1, 4-bonds between 15% and 80% (mol %).

The diene elastomer can also predominantly, indeed even exclusively, comprise a polybutadiene.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature Tg, measured according to ASTM D3418) of between 0° C. and −70'C and more particularly between −10'C and −60'C, a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40'C to −80'C, or isoprene/styrene copolymers and especially those having a styrene content of between 5% and 50% by weight and a Tg of between −5'C and −50'C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5'C and −70'C, are especially suitable.

Crosslinking System

The crosslinking system can be based on sulfur and/or on sulfur donors and/or on peroxide and/or on bismaleimides. The crosslinking system is preferentially a vulcanization system, i.e. a system based on sulfur (or on a sulfur-donating agent) and on a primary vulcanization accelerator. To this base vulcanization system, various known secondary vulcanization accelerators or vulcanization activators are added, such as zinc oxide, stearic acid or equivalent compounds, or guanidine derivatives (in particular diphenylguanidine), or else known vulcanization retarders, which are incorporated during the first non-productive phase and/or during the productive phase, as described subsequently.

The sulfur may be used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

Reinforcing Filler

The reinforcing filler is known for its abilities to reinforce a rubber composition which can be used in the manufacture of tyres.

According to the invention, the reinforcing filler can comprise carbon black, an organic filler other than carbon black, an inorganic filler or the mixture of at least two of these fillers. Preferentially, the reinforcing filler can predominantly comprise, indeed even exclusively comprise, carbon black. The reinforcing filler can also predominantly comprise, indeed even exclusively comprise, a reinforcing inorganic filler.

Such a reinforcing filler typically consists of nanoparticles, the (weight-)average size of which is less than a micrometre, generally less than 500 nm, most commonly between 20 and 200 nm, in particular and more preferentially between 20 and 150 nm.

The carbon black has a BET specific surface area preferably of at least 90 $m^2/g$, more preferentially of at least 100 $m^2/g$. The blacks conventionally used in tyres or their treads ("tyre-grade" blacks) are suitable in this regard. Among the latter, mention will more particularly be made of the reinforcing carbon blacks of the 100, 200 and 300 series, or the blacks of the 500, 600 or 700 series (ASTM grades), such as, for example, the N115, N134, N234, N326, N330, N339, N347, N375, N550, N683 and N772 blacks. These carbon blacks can be used in the isolated state, as commercially available, or in any other form, for example as support for some of the rubber additives used. The carbon blacks might, for example, be already incorporated in the diene elastomer, especially isoprene elastomer, in the form of a masterbatch (see, for example, applications WO 97/36724 and WO 99/16600). The BET specific surface area of the carbon blacks is measured according to standard D6556-10 [multipoint (at least 5 points) method—gas: nitrogen—relative pressure P/PO range: 0.1 to 0.3].

Mention may be made, as examples of organic fillers other than carbon blacks, of functionalized polyvinyl organic fillers, such as described in applications WO 2006/069792, WO 2006/069793, WO 2008/003434 and WO 2008/003435.

The term "reinforcing inorganic filler" should be understood here to mean any inorganic or mineral filler, regardless of its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, preferentially silica ($SiO_2$), are especially suitable as reinforcing inorganic fillers. The silica used can be any reinforcing silica known to those skilled in the art, especially any precipitated or fumed silica exhibiting a BET surface area and also a CTAB specific surface area both of less than 450 $m^2/g$, preferably from 30 to 400 $m^2/g$, especially between 60 and 300 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/016387.

In the present account, as regards the silica, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface area is the external surface determined according to French Standard NFT 45-007 of November 1987 (method B).

Mineral fillers of the aluminous type, in particular alumina ($Al_2O_3$) or aluminium (oxide) hydroxides, or also reinforcing titanium oxides, for example described in U.S. Pat. Nos. 6,610,261 and 6,747,087, are also suitable as reinforcing inorganic fillers.

The physical state in which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described above.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional.

The content of coupling agent is advantageously less than 12 phr, it being understood that it is generally desirable to use as little as possible of it. Typically, the content of coupling agent represents from 0.5% to 15% by weight relative to the amount of inorganic filler. Its content is preferentially between 0.5 and 9 phr, more preferentially within a range extending from 3 to 9 phr. This content is easily adjusted by those skilled in the art depending on the content of inorganic filler used in the composition.

According to the invention, the content of reinforcing filler can be within a range extending from 10 to 90 phr, preferably from 10 to 70 phr, preferably from 25 to 60 phr. Advantageously, the content of reinforcing filler is within a range extending from 10 to 30% of the fraction by volume, preferably from 15 to 25% of the fraction by volume, relative to the volume of the composition having a low stiffness modulus.

Short Fibres

According to the invention, the short fibres:
- have a thickness within a range extending from 5 to 40 μm, a length within a range extending from 0.5 to 10 mm and a Young's modulus, the value of which is within a range extending from 0.5 to 800 GPa,
- are present in the elastomeric matrix at a concentration within a range extending from 5 to 30 phr, and
- are oriented in circumferential planes according to the same angle α expressed in degrees relative to the radial plane, the angle α being defined by the formula $\alpha=45+/-x$, in which x is within a range extending from 10 to 30.

Advantageously, the thickness of the short fibres is within a range extending from 5 to 35 μm, further preferably from 10 to 30 μm.

Moreover, regardless of the thickness of the short fibres, the length thereof is advantageously within a range extending from 1 to 9 mm, preferably from 2 to 8 mm.

Those skilled in the art can measure the thickness and/or the length of the short fibres by optical microscopy using an automated optical analysis by one of the methods described in "A Review of Image Analysis Based Methods to Evaluate Fiber Properties", Ulrich Hirn and Wolfgang Bauer, Lenzinger Berichte, 86 (2006) 96-105.

The short fibres may be obtained by cutting long fibres to the desired dimension.

By respecting the abovementioned ranges of lengths from 0.5 to 10 mm and thicknesses from 5 to 40 µm, the aspect ratio of the short fibres, that is to say the ratio between the length and the thickness of the fibres, is within a range extending from 12.5 to 2000. Advantageously, the aspect ratio may be within a range extending from 50 to 1500, preferably from 100 to 1000.

The short fibres may have any known cross section, for example cubic, cylindrical or star shaped. The fibres preferably have a cylindrical cross section. In this case, the thickness corresponds to the diameter of the short fibres.

Advantageously, the Young's modulus of the short fibres may be within a range extending from 0.5 to 500 GPa, further preferably from 0.5 to 200 GPa, further preferably from 0.5 to 50 GPa.

Those skilled in the art can measure the Young's modulus of the short fibres according to standard ASTM D885 on the long fibres from which the short fibres are derived.

The short fibres may be of any nature making it possible to confer upon them a Young's modulus, the value of which is within a range extending from 0.5 to 300 GPa. They may be, for example, PET (polyethylene terephthalate), nylon, PBT (polybutylene terephthalate), aramid or PBO (Poly-p-phenylene benzobisoxazole) fibres, natural fibres and the mixture of at least two of these fibres. They may be, for example, Zylon® PBO-AS (Poly(p-phenylene-2,6-benzobisoxazole)) fibres, Zylon® PBO-HM (Poly(p-phenylene-2,6-benzobisoxazole)) fibres, or Dyneema® SK60 and SK71 ultra high density polyethylene fibres, all sold by Toyobo, Japan. They may also be organic fibres composed of aliphatic polyamides, polyesters, polyacrylonitriles, polyvinyl alcohols, polyolefins, polyvinyl chlorides, polyvinylidene chlorides, polyurethanes, polyfluorocarbons, phenolic compounds, polybenzimidazoles, polyphenylenetriazoles, polyphenylene sulfides, polyoxadiazoles, polyimides, aromatic polyamides or a mixture thereof; preferably, the aromatic polyamide is a (p-phenylene terephthalamide), poly(m-phenylene isophthalamide) or a mixture thereof, or of any organic fibre described in U.S. Pat. Nos. 3,869,430, 3,869,429, 3,767,756 and 2,999,788. Moreover, by way of example of natural fibres, mention may be made of cellulose, cotton and wood fibres. Advantageously, the short fibres are selected from aramid and nylon fibres.

Those skilled in the art may guide their choices of combination of short fibres and of elastomeric matrix by referring to the following references: D. W. van Krevelen, Properties of polymers: their correlation with chemical structure: their numerical estimation and prediction from additive group contributions; Tucker, C. L. and Liang, E., Stiffness predictions for unidirectional short fiber composites: review and evaluation. Composites Science and Technology, 59, 655-71 (1999).

Those skilled in the art understand well that the composite material may comprise fibres having one or more different characteristics or else fibres all having the same characteristics. "Characteristics of the short fibres" is intended to mean the thickness, the length, the aspect ratio, the Young's modulus or the nature of the short fibres. Advantageously, the short fibres within the composite material, preferably within a tread pattern, have identical characteristics.

According to the invention, the fibres may advantageously be rendered adhesive, that is to say be treated so as to improve their adhesion to the elastomeric matrix. For example, the short fibres may be rendered adhesive with an adhesive selected from epoxy adhesives, followed by a treatment with liquid resorcinol/formaldehyde latex (RFL), and formaldehyde-based adhesives, preferably RFL adhesives. As example of RFL adhesive of use for rendering the short fibres adhesive, mention may be made of those described in application WO 2001/057116.

The content of short fibres may advantageously be within a range extending from 5 to 20 phr, further preferably from 5 to 15 phr, further preferably from 5 to 10 phr.

As indicated above, the short fibres are oriented in circumferential planes according to the same angle $\alpha$ expressed in degrees relative to the radial plane, the angle $\alpha$ being defined by the formula $\alpha=45+/-x$, in which x is within a range extending from 10 to 30. In other words, the short fibres are oriented in circumferential planes according to the same angle $\alpha$ expressed in degrees relative to the radial plane, the angle $\alpha$ being within a range extending from 15 to 35 degrees or from 55 to 75 degrees.

Unless indicated otherwise, the orientation of the fibres in the tread according to the invention is expressed relative to a tread arranged on a tyre. Those skilled in the art will know how to readily convert the orientation of the short fibres when the tread is arranged flat, for example in the form of a semi-finished article. In the event that the tread is arranged flat, it could be defined according to directions parallel to its length, its width and its thickness, which would correspond, respectively, to the circumferential "X", transverse "Y" and radial "Z" directions. The circumferential plane would then be a plane defined by the length and the thickness of the tread, and the radial plane would be a plane defined by the width and the thickness of the tread.

Those skilled in the art can measure the angle of the short fibres within the tread by removing a part of the tread, preferentially by removing half the width of a rib along a plane parallel to the plan XoZ, so as to make an interface appear that contains the short fibres, and by taking a test specimen of material by cutting the tread according to FIG. 2, and by creating the histogram of orientation of the fibres in the plane XOZ relative to the direction Z by optical reflection microscopy on a sample of at least 100 fibres, in accordance with the recommendations of a person skilled in the art in "Orientation des fibres courtes dans les pieces en thermoplastique renforcé—Observation de l'orientation des fibres [*Orientation of short fibres in reinforced thermoplastic parts—observing the orientation of the fibres*]", Techniques de l'ingénieur [Engineering techniques], Reference AM3729, 10 Jul. 2003, Michel Vincent.

According to the invention, the short fibres may be oriented in circumferential planes according to the same angle $\alpha$ expressed in degrees relative to the radial plane, the angle $\alpha$ being defined by the formula $\alpha=45+/-x$, in which x is within a range extending from 12.5 to 27.5 (that is to say from 17.5 to 35.5 degrees or from 57.5 to 72.5 degrees), preferably from 15 to 25 (that is to say from 20 to 30 degrees or from 60 to 70 degrees); preferably, x is equal to 20 (that is to say 25 degrees or 65 degrees). Unless indicated otherwise, the angle $\alpha$ is expressed as an absolute value.

Those skilled in the art understand well that when reference is made to short fibres oriented according to the same angle α, this may be short fibres having substantially the same angle α, that is to say that the short fibres are oriented according to an angle α with a low standard deviation, for example a standard deviation of 3 degrees, or even less, over at least 80% of the surface of the plane XoZ.

Regardless of the value of the angle α in the range of α=45+/−10 to 30 degrees, this orientation gives the composite material the ability to transfer a portion of the component Fz of the ground forces on the tyre to the component Fx, that is to say from the vertical component to the horizontal component in the direction of running of the tyre. This level of coupling is particularly advantageous for improving the wear resistance of tyres for civil engineering vehicles, especially in their specific conditions of use.

Depending on the angle of the fibres within the tread pattern, the level of coupling is not the same. Thus, when the angle α is between 15 and 35 degrees (that is to say α=45-from 10 to 30), the tread pattern will transform the component Fz into a positive component Fx. It may be noted that the closer the angle α is to 25 degrees, the higher is the level of coupling. This embodiment is particularly advantageous for improving the wear resistance of tyres for vehicles bearing heavy loads uphill.

Moreover, when the angle α is between 55 and 75 degrees (that is to say α=45+from 10 to 30), the tread pattern will transform the component Fz into a negative component Fx. The closer the angle α is to 65 degrees, the higher is the level of coupling. This embodiment is particularly advantageous for improving the wear resistance of tyres for vehicles running empty downhill.

When the angle α is between 35 and 55 degrees, the level of coupling becomes too low, or even zero at around 45 degrees, to give the desired property to the tread pattern of the tread according to the invention. The same applies when the angle α is less than 15 degrees or greater than 75 degrees.

The present invention therefore provides those skilled in the art with composite materials that make it possible to transfer a ground force on the tyre from the component Fz into different components Fx, and therefore to generate a significant level of coupling. Those skilled in the art may thus choose specific orientations of fibres in the tread pattern of a tyre as a function of the conditions of use of the tyre.

Various Additives

The composite material can also comprise all or a portion of the usual additives customarily used in elastomer compositions intended to constitute treads, such as, for example, plasticizers, pigments, protective agents, such as antiozone waxes, chemical antiozonants or antioxidants, or antifatigue agents, well known to those skilled in the art. It may also comprise other types of fibres such as those described in the present description.

Tread Pattern of the Tread

The tread according to the present invention comprises a tread pattern.

According to the invention, the tread pattern of the tread may be entirely formed of composite material.

According to the invention, the tread pattern of the tread may be formed of a plurality of parallel layers adjacent to one another. According to the invention, the layers of the plurality of layers may be oriented in the tread pattern parallel to the plane defined by the orientation of the short fibres in the tread pattern and the axial direction (FIGS. 3 and 4). The layers of the plurality of layers may also be oriented in the tread pattern parallel to the equatorial plane (FIG. 2).

Advantageously, regardless of the orientation of the layers in the tread pattern, each of the layers of the plurality of layers may be formed by composite material.

According to the invention, the layers of the plurality of layers may be identical or different. Preferably, the layers of the plurality of layers are predominantly, preferably exclusively, identical.

In the present document, "a group of layers" is intended to mean one or more layers identical to one another. In other words, when the plurality of layers comprises several groups of different layers, these layers may differ from one another by the thickness, the length, the aspect ratio, the Young's modulus, the concentration, or the nature of the short fibres, when they are present, or else the nature of the elastomeric matrix, the nature or the concentration of reinforcing filler, crosslinking system, additives, etc.

According to the invention, the tread pattern may comprise, for example, several (that is to say at least two) different layers of composite material. It may also comprise at least one layer of composite material and at least one (that is to say one or more) layer of an elastomeric composition other than the composite material.

When the layers are different, the plurality of layers may be formed by two groups of different layers, or even more, for example three, four or five groups of layers that are different from one another. Advantageously, the plurality of layers is formed of two groups of different layers.

Any distribution of the layers of different groups may be employed. For example, the layers of different groups may or may not be distributed alternately. For example, when the plurality of layers comprises two groups of different layers (for example referred to as A and B, respectively), the distribution may follow the following formula:

$$((A)_{nA}(B)_{nB}),$$

in which:

"nA" and "nB" represent, independently of one another, an integer chosen from 1 to 10, preferably from 1 to 5, preferably from 1 to 2, preferably 1.

When the composite material comprises more than two groups of different layers (for example referred to as A, B, . . . , X, respectively), the distribution may follow the following formula:

$$((A)_{nA}(B)_{nB}(\ldots)_n \ldots (X)_{nX}),$$

in which:

"nA", "nB", "n . . . " and "nX" represent, independently of one another, an integer chosen from 1 to 10, preferably from 1 to 5, preferably from 1 to 2, preferably 1.

The total number of layers within the tread pattern is limited by the length of the tread. Those skilled in the art are able to determine this number as a function of the thickness of the layers and of their orientation within the tread pattern.

Preferably, when the layers of the plurality of layers are different, the tread pattern of the tread is formed of two groups of different layers, preferably distributed alternately within the tread pattern of the tread.

According to a particular embodiment of the present invention, the plurality of layers comprises layers of composite material and layers of an elastomeric composition other than the composite material, which are arranged alternately. Preferably, the plurality of layers comprises a group of layers of composite material and a group of layers of an elastomeric composition other than the composite material, the layers of the composite material and the layers of the elastomeric composition other than the composite material being arranged alternately (FIG. 4).

According to the invention, the elastomeric composition other than the composite material may comprise an elastomer chosen from any diene elastomer described in the present document. For example, the elastomeric composition other than the composite material may comprise an elastomer selected from isoprene elastomers, butadiene and styrene copolymers, polybutadienes and mixtures thereof, preferably an elastomer selected from isoprene elastomers, preferably natural rubber.

According to the invention, the elastomeric composition other than the composite material may advantageously also comprise a crosslinking system and/or a reinforcing filler and/or additives. In particular, the elastomeric composition other than the composite material may comprise any crosslinking system and/or reinforcing filler and/or additives described in the present document.

Advantageously, the elastomeric composition other than the composite material has a stiffness at extension which is at least 5 times less, preferably at least 10 times less, than that of said composite material in the main direction of the fibres. Those skilled in the art are able to determine how to measure the stiffness at extension of the composite material and of the elastomeric composition other than the composite material. For example, they may use a method based on standard NF ISO 37 of December 2005 on a type 2 dumbbell type test specimen and measure the elastic modulus at 5% deformation, at 23° C. When the direction of extension is the main direction of orientation of the fibres, this modulus of extension will be denoted EL and when the direction of extension is orthogonal to the main direction of the fibres, this modulus of extension will be denoted ET.

Advantageously, the longitudinal modulus (in the direction of the fibres) $E_C^L$ and the transverse modulus (in the direction perpendicular to the fibres) $E_C^T$ define $\beta=E_C^T/E_C^L$, and the fraction by volume $\phi C$ of the composite material and the modulus $E_M$ and the fraction by volume $\phi M$ (or $1-\phi C$) of the elastomeric composition other than the composite material are defined such that the formula $$\frac{\alpha\beta}{[\phi C+(1-\phi C)\alpha\beta][\phi C\alpha+(1-\phi C)]}, \text{ in which } \alpha=E_C^L/E_M$$

is less than 0.67, preferably between 0.01 and 0.5.

The thickness of each of the layers of the composite material may be within a range extending from 1 to 20 mm, preferably from 1 to 10 mm.

The thickness of each of the layers of the elastomeric composition other than the composite material may be within a range extending from 1 to 20 mm, preferably from 1 to 10 mm.

Advantageously, the volume of the layers of the elastomeric composition other than the composite material may represent from 50 to 95% by volume, preferably from 60 to 95% by volume relative to the volume of the tread pattern of the tread. Thus, the volume of the layers of composite material may represent respectively from 5 to 50% by volume, preferably from 5 to 40% by volume relative to the volume of the tread pattern of the tread.

Tyres

The present invention may be applied to any type of tyre. Thus, another subject of the present invention is a tyre comprising a tread according to the invention.

Generally, a tyre comprises a tread intended to come into contact with the ground via a running surface and connected via two sidewalls to two beads, the two beads being intended to provide a mechanical connection between the tyre and the rim on which the tyre is fitted.

A radial tyre more particularly comprises a reinforcement comprising a crown reinforcement radially internal to the tread and a carcass reinforcement radially internal to the crown reinforcement.

A tyre may be provided with a carcass reinforcement surmounted radially on the outside by a crown reinforcement in order to produce hooping of said carcass reinforcement. The crown reinforcement is generally formed by a stack of a plurality of reinforcing plies, these reinforcers forming generally non-zero angles with the circumferential direction.

A tyre especially comprises a tread, the running surface of which is provided with a tread pattern formed by a plurality of grooves delimiting elements in relief (tread blocks, ribs) so as to generate edge corners and also voids. These grooves represent a volume of voids which, related to the total volume of the tread (including both the volume of elements in relief and that of all the grooves), is expressed by a percentage denoted, in the present document, by "volumetric void ratio". A volumetric void ratio equal to zero indicates a tread without grooves or voids.

The present invention is particularly well suited to tyres intended for civil engineering vehicles and to heavy-duty vehicles, more particularly to civil engineering vehicles, the tyres of which are subjected to particularly specific stresses. Thus, advantageously, the tyre according to the invention is a tyre for civil engineering or heavy-duty vehicles, preferably civil engineering vehicles.

The tread according to the invention may have one or more grooves, the mean depth of which ranges from 15 to 120 mm, preferably 65 to 120 mm.

The tyres according to the invention may have a diameter ranging from 20 to 63 inches, preferably from 35 to 63 inches.

Moreover, the mean volumetric void ratio over the whole of the tread according to the invention may be within a range extending from 5 to 40%, preferably of from 5 to 25%.

Preparation of the Composite Materials

The tread patterns of the tread may be obtained according to the process defined below. In this case, the short fibres of the composite material are integrated into the preparation process during the non-productive phase with a mixture produced beforehand containing all the ingredients with the exception of the short fibres, which will be referred to as masterbatch.

The masterbatches (mixtures containing all the ingredients with the exception of the crosslinking system) can be manufactured in appropriate mixers, using two successive preparation phases according to a general procedure well known to those skilled in the art: a first phase of thermo-mechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically of less than 110° C., for example between 40° C. and 100° C., during which finishing phase the chemical crosslinking agent, in particular the crosslinking system, is incorporated. In a second stage, the masterbatch is taken up in a non-productive phase with the short fibres at a lower temperature, typically of less than 110° C., for example between 40° C. and 100° C., so as not to initiate crosslinking.

By way of example, in order to obtain the masterbatches, the first (non-productive) phase is carried out in a single thermomechanical step during which all the necessary constituents, with the exception of the short fibres, the optional additional covering agents or processing aids and various other additives, with the exception of the vulcanization system, are introduced into an appropriate mixer, such as an ordinary internal mixer. The total duration of the kneading, in this non-productive phase, is preferably between 2 and 10 min. After cooling the mixture thus obtained during the first non-productive phase, the vulcanisation system is then incorporated at low temperature, generally in an external mixer, such as an open mill; everything is then mixed (productive phase) for a few minutes, for example between 5 and 15 min. By way of example, the taking up of the masterbatch and the addition of the short fibres are carried out in a single thermomechanical step in an appropriate mixer, such as an ordinary internal mixer. The total duration of the kneading is preferably between 2 and 5 min.

The composition for tread pattern thus obtained is then calendered, for example in the form of a layer, such that the short fibres are oriented in a single direction within the layer. This orientation may be produced according to processes well known to those skilled in the art, especially the process described in application WO 2008/027045.

For example, obtaining layers in which the short fibres are oriented in a single direction consists in producing sheets of non-vulcanized elastomer containing short fibres by virtue of calendering using an open mill. This first step makes it possible to begin the orientation of the short fibres in the calendering direction. In terms of shaping, the sheets obtained in the first step are cut up and extruded by means of a micronozzle. This second step makes it possible to obtain layers of elastomer in which the short fibres are oriented in the extrusion direction.

Alternatively, the orientation is obtained by producing a layer of non-vulcanized elastomer containing short fibres by virtue of calendering using an open mill (A1 and A2) and a receiving roll (B) at the outlet of the mill, as represented in FIG. 5. The layer leaving the mill is arranged in contact with the receiving roll (B). The receiving roll is regulated so as to have a tangential speed greater than the tangential speed of the cylinders of the mill, without causing tearing of the layer. This tangential speed difference makes it possible to orient the short fibres in the calendering direction. Those skilled in the art are able to determine the respective tangential speeds of the cylinders and of the receiving roll.

In order to obtain the desired orientation of the short fibres in the tread according to the present invention, use may be made of any technique well known to those skilled in the art, especially the process described in application WO 2008/027045. For example, layers containing fibres oriented in a single direction may be assembled flat and cut by any suitable means, for example by water jet cutting, at the desired angle, so as to form tread pattern elements that may be arranged on an uncured tyre in a manner well known to those skilled in the art.

When the tread pattern comprises layers of an elastomeric composition other than the composite material, this composition may be prepared according to a process similar to that described above. This may for example be the process described above but not comprising the addition of short fibres.

Other advantages may yet become apparent to those skilled in the art on reading the examples below, which are illustrated by the appended figures and which are given by way of illustration and without limitation.

BRIEF DESCRIPTION OF THE FIGURES

FIG. 3B differs from FIG. 4A solely in that the layers are oriented according to an angle (b) of 65 degrees relative to the plane YZ.

EXAMPLES

Figure 1:
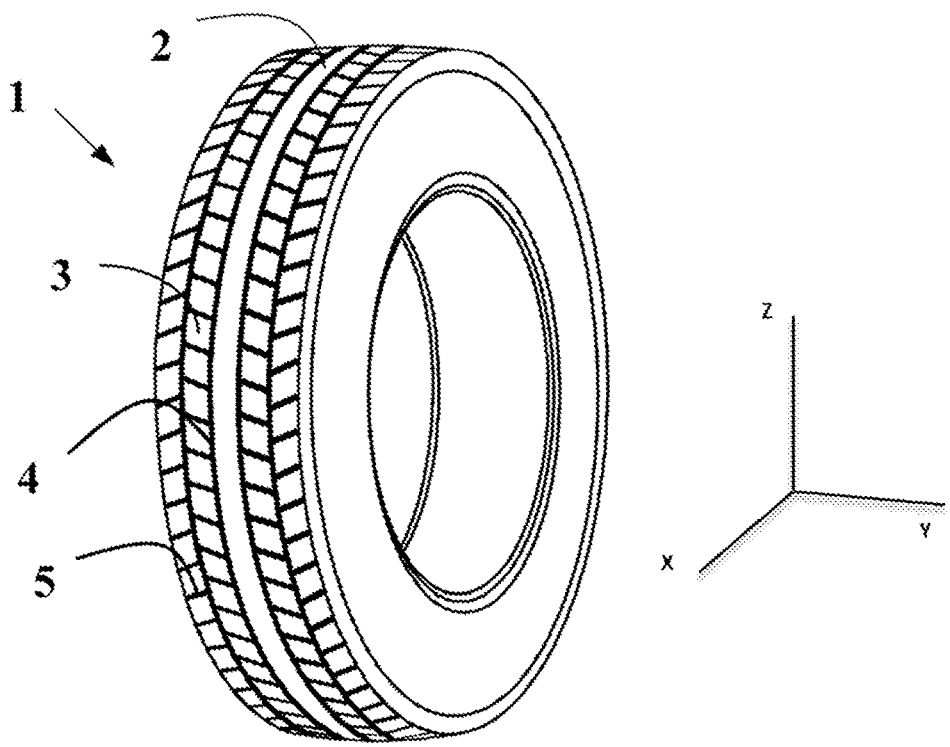
FIG. 1 is a schematic depiction of a tyre (1), the tread of which comprises a rib (2) located in the central zone of the tyre (1), and tread blocks (3), the rib and the tread blocks being separated by circumferential grooves (4) and substantially transverse grooves (5).
Figure 2:
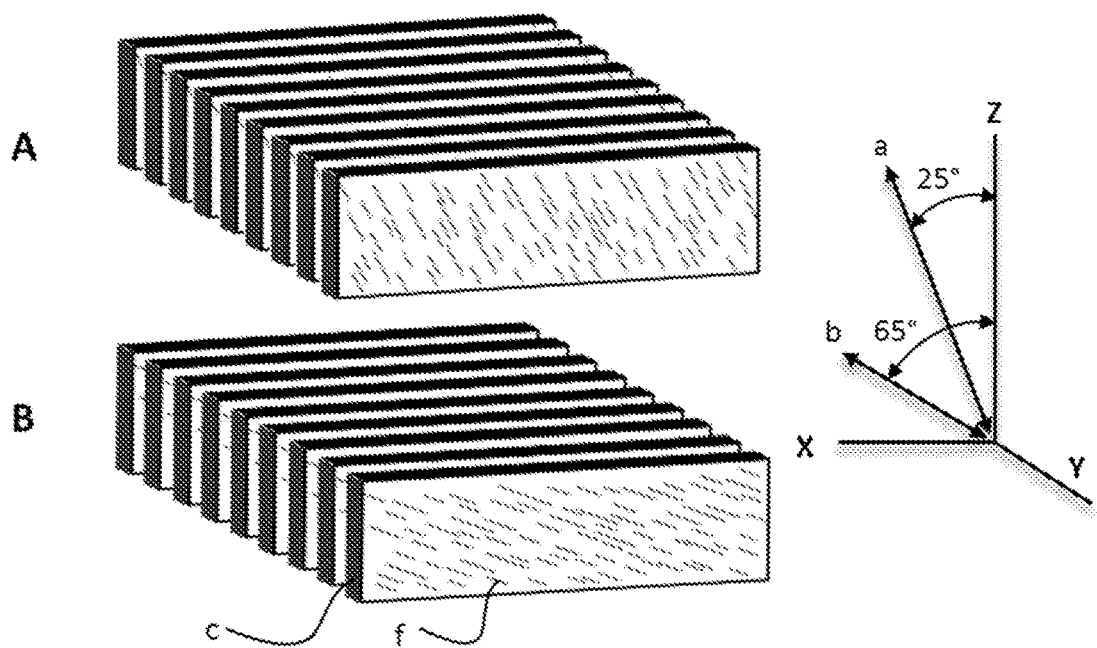
FIG. 2A is a schematic depiction of an embodiment of a tread pattern according to the invention, viewed in perspective. This tread pattern is composed of several layers (c) of composite material according to the invention, which are parallel and adjacent to one another and oriented parallel to a plane XZ in which X corresponds to the running direction of the tyre and Z corresponds to the thickness of the composite material. The short fibres (f) are oriented parallel to the plane XZ according to an angle (a) of 25 degrees relative to the plane YZ or Y corresponding to the transverse direction of the tread pattern.
FIG. 2B differs from FIG. 1A solely in that the short fibres (f) are oriented according to an angle (b) of 65 degrees relative to the plane YZ.
Figure 3:
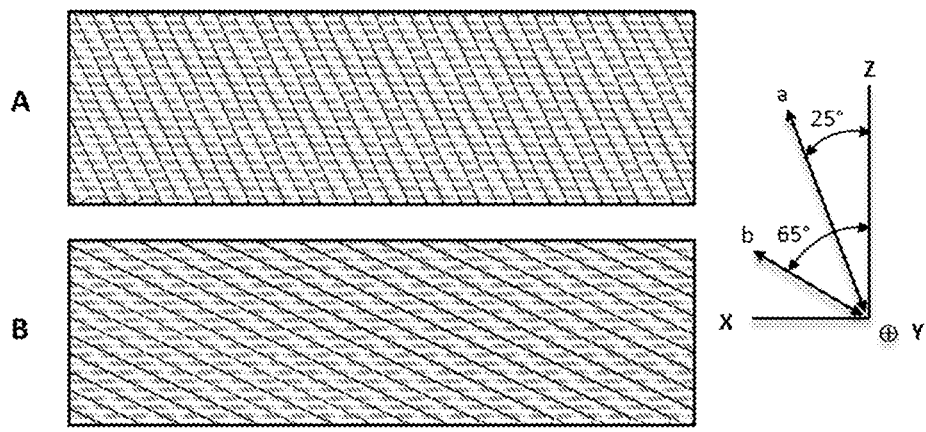
FIG. 3A is a schematic depiction of an embodiment of a tread pattern according to the invention, viewed in section along the plane XZ. This tread pattern is composed of several layers of composite material according to the invention, which are parallel and adjacent to one another and oriented parallel to a plane which is (i) perpendicular to the plane XZ and (ii) oriented at an angle (a) of 25 degrees relative to the plane YZ. The short fibres are arranged parallel to the plane of the layers in the plane XZ.
FIG. 3B differs from FIG. 2A solely in that the layers are oriented according to an angle (b) of 65 degrees relative to the plane YZ.
Figure 4:
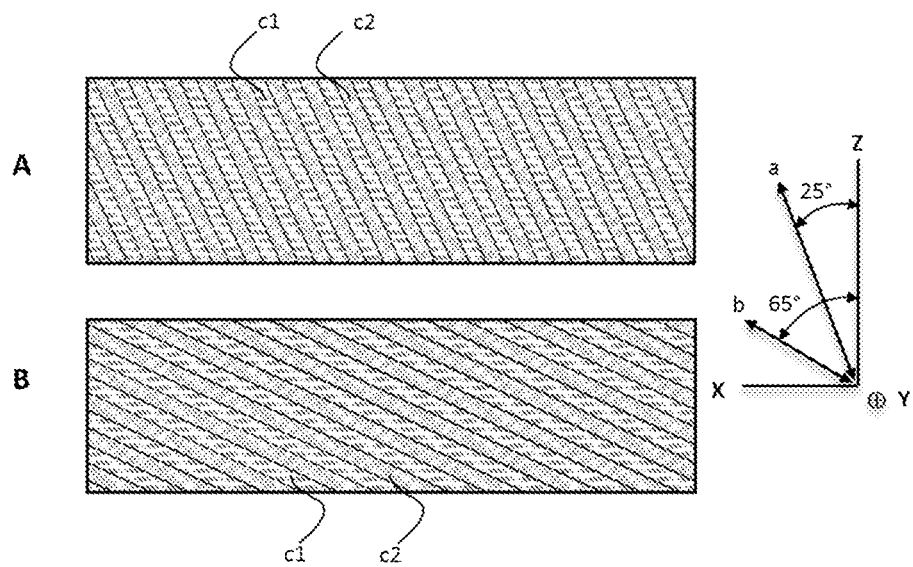
FIG. 4A is a schematic depiction of an embodiment of a tread pattern according to the invention, viewed in section along the plane XZ. This tread pattern is composed of a plurality of layers (c1) of composite material according to the invention and of layers (c2) of an elastomeric composition other than the composite material, which are parallel and adjacent to one another and arranged alternately and oriented parallel to a plane which is (i) perpendicular to the plane XZ and (ii) oriented at an angle (a) of 25 degrees relative to the plane YZ. The short fibres are arranged parallel to the plane of the layers in the plane XZ.
Figure 5:
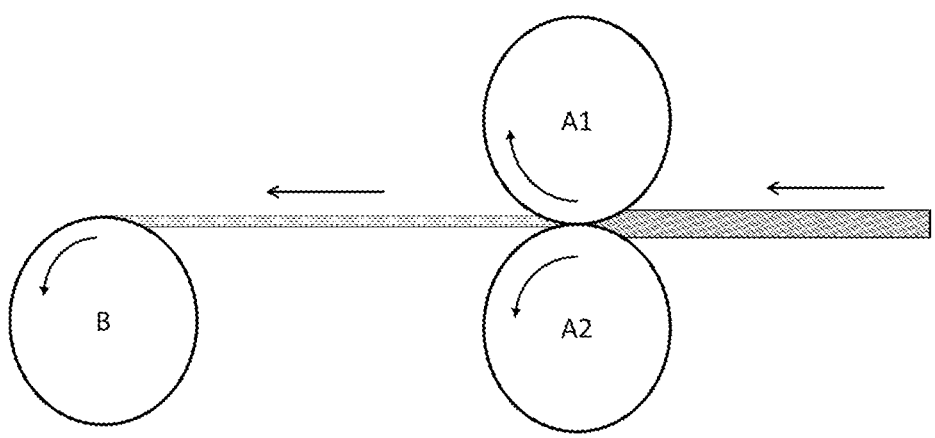
FIG. 5 is a schematic depiction of a device making it possible to orient short fibres within an elastomer layer. "A1" and "A2" represent the cylinders of a calender. "B" represents a receiving roll, on which a layer leaving the calender is arranged.

Samples with 10 cm×10 cm surface area and 3 cm thickness were produced according to the process described in application WO 2008/027045 with layers with a thickness of 2 mm, from different compositions.

The following definitions apply:
 "X": a direction parallel to the direction of stress loading of the sample, itself parallel to the length of the sample.
 "Y": a direction parallel to the width of the sample.
 "Z": a direction parallel to the thickness of the sample.

A control sample was produced from a composition A which is a composition conventionally used in tyre treads for civil engineering vehicles. This composition A does not comprise short fibres or any other type of fibres.

Samples were produced from compositions B1 and B2 which are composite materials in accordance with the present invention. These compositions differ from the composition A in that they comprise short aramid fibres, oriented in the plane defined by the directions X and Z according to an angle of 25 degrees relative to the direction Z.

Each of the samples was prepared according to two embodiments:
  with layers parallel to a plane defined by the directions X and Z, and
  with layers parallel to a plane defined by (i) the direction Y and (ii) a straight line oriented at 25 degrees relative to the direction Z in a plane defined by the directions X and Z.

The mechanical properties were measured after curing the abovementioned compositions at a temperature of 150° C. for 30 minutes. The results were obtained from type 2 dumbbell type test specimens at 5% deformation, at 23° C. according to standard NF ISO 37 of December 2005. When the direction of extension is the main direction of orientation of the fibres, this modulus of extension will be denoted EL, and when the direction of extension is orthogonal to the main direction of the fibres, this modulus of extension will be denoted ET. The modulus of extension results are presented to a base 100, relative to the modulus of extension of the sample EL of control A.

In order to analyse the transfer of ground forces on the test specimen, from the vertical component (Fz) to the horizontal component in the running direction (Fx) (the level of coupling), a force Fz of 900 daN, corresponding to a mean pressure of 9 bar, or of 600 daN, corresponding to a mean pressure of 6 bar, was applied to the surface of the samples using an electric actuating cylinder and the resulting force Fx was measured using a force sensor. The ratio of Fx divided by Fz is referred to as the level of coupling and is measured at two different mean pressures.

The compositions A, B1 and B2 and the experimental results are presented in table 1 below.

TABLE 1

|  | A | B1 | B2 |
|---|---|---|---|
| NR (1) | 100 | 100 | 100 |
| Silica (2) | 15 | 15 | 15 |
| Carbon black (3) | 40 | 40 | 40 |
| ZnO (4) | 3 | 3 | 3 |
| Stearic acid | 1 | 1 | 1 |
| Short fibres (5) | — | 11 | 23.5 |
| Sulfur | 2 | 2 | 2 |
| Accelerator (6) | 1.7 | 1.7 | 1.7 |
| Modulus of extension EL (a) | 100 | 3210 | 5870 |
| Modulus of extension ET (b) | 115 | 276 | 584 |
| EL/ET ratio | 0.87 | 11.65 | 10.05 |
| Level of coupling under a mean pressure of 6 bar | 0.0% | 18.4% | 18.9% |
| Level of coupling under a mean pressure of 9 bar | 0.0% | 21.4% | 21.5% |

(1) Natural rubber
(2) Ultrasil VN3, sold by Evonik
(3) Carbon black of N234 grade according to standard ASTM D-1765
(4) Zinc oxide of industrial grade from Umicore
(5) Short aramid fibres treated with RFL, from Barnet, 5 mm long and 15 μm in diameter
(6) N-cyclohexyl-2-benzothiazolesulfenamide, Santocure CBS, sold by Flexsys
(a) Elastic modulus at 5% deformation and, for the fibre-based compositions, the direction of extension is in the main direction of the fibres
(b) Elastic modulus at 5% deformation and, for the fibre-based compositions, the direction of extension is orthogonal to the main direction of the fibres These results show that the samples B1 and B2 in accordance with the present invention have moduli of extension EL and ET that are far greater than those of the control sample A which does not comprise oriented short fibres. Moreover, the samples B1 and B2 generate a level of coupling compared to the control composition A.

These results also show that the level of coupling obtained is the same for the two concentrations of short fibres tested. The effect was observed from 5 phr of short fibres in the composite material.

An additional experiment was carried out, comparing the level of coupling of the sample B1 above with that of the sample A and that of a sample C1 which only differs from the sample B1 in that the short fibres are oriented at 65 degrees (as opposed to 25 degrees for sample B1). The results are presented in table 2 below.

TABLE 2

|  | A (25 degrees) | B1 (25 degrees) | C1 (65 degrees) |
|---|---|---|---|
| Level of coupling under a mean pressure of 6 bar | 0.0% | 29.3% | −8.4% |
| Level of coupling under a mean pressure of 9 bar | 0.0% | 31.5% | −10.1% |

These results show that the level of coupling obtained with an orientation of the short fibres at 65 degrees is in an opposite direction to that obtained with an orientation of the short fibres at 25 degrees. This clearly demonstrates that there is an angle for which the level of coupling is zero between 25 and 65 degrees, especially at 45 degrees.

The various measurements carried out by the applicants have demonstrated that the level of coupling obtained was sufficient for implementing the present invention when the fibres are oriented according to an angle of 15 to 35 degrees or 55 to 75 degrees.

The present invention therefore provides treads making it possible to transfer a proportion of the ground forces on the tyre from the component Fz into different components Fx, making it possible to effectively improve the wear resistance of the tyres. These results are particularly beneficial for vehicles running on non-bituminous ground, such as the majority of civil engineering vehicles and some heavy-duty vehicles.

The invention claimed is:

1. A tread comprising a tread pattern, said tread pattern comprising a composite material based on an elastomeric matrix, a crosslinking system, a reinforcing filler and short fibers,
  wherein the short fibers have a thickness within a range extending from 5 to 40 μm, a length within a range extending from 0.5 to 10 mm, and a Young's modulus within a range extending from 0.5 to 800 GPa,
  wherein the short fibers are present in the elastomeric matrix at a concentration within a range extending from 5 to 30 parts by weight per hundred parts by weight of elastomer, phr,
  wherein the short fibers are oriented in circumferential planes according to the same angle α expressed in degrees relative to the radial plane, the angle α being defined by the formula α=45+/−x, in which x is within a range extending from 10 to 30,
  wherein the tread pattern is composed of a plurality of parallel layers adjacent to one another, and
  wherein the layers of the plurality of layers are oriented in the tread pattern parallel to the plane defined by the orientation of the short fibers in the tread pattern and the axial direction.

2. The tread according to claim 1, wherein the elastomeric matrix comprises a diene elastomer.

3. The tread according to claim 1, wherein the thickness of the short fibers is within a range extending from 5 to 35 μm.

4. The tread according to claim 1, wherein the length of the short fibers is within a range extending from 1 to 9 mm.

5. The tread according to claim 1, wherein the ratio between the length and the thickness of the short fibers s within a range extending from 12.5 to 2000.

6. The tread according to claim 1, wherein the Young's modulus of the short fibers is within a range extending from 0.5 to 500 GPa.

7. The tread according to claim 1, wherein the short fibers are fibers selected from PET, nylon, PBT, aramid, PBO, natural fibers and mixtures thereof.

8. The tread according to claim 1, wherein the short fibers are rendered adhesive.

9. The tread according to claim 1, wherein the concentration of short fibers is within a range extending from 5 to 20 phr.

10. The tread according to claim 1, wherein each of the layers of the plurality of layers is formed by the composite material.

11. The tread according to claim 10, wherein the layers of the composite material have a thickness within a range extending from 1 to 20 mm.

12. The tread according to claim 1, wherein the plurality of layers comprises layers of the composite material and layers of an elastomeric composition different from the elastomeric composition of the composite material.

13. The tread according to claim 12, wherein the layers of the composite material and the layers of the elastomeric composition different from the elastomeric composition of the composite material are arranged alternately.

14. The tread according to claim 12, wherein the elastomeric composition different from the elastomeric composition of the composite material comprises an elastomer selected from isoprene elastomers, butadiene and styrene copolymers, polybutadienes and mixtures thereof.

15. The tread according to claim 12, wherein the longitudinal modulus $E^L_C$ and the transverse modulus $E^T_C$ define $\beta = E^T_C/E^L_C$, and the fraction by volume φC of the composite material and the modulus EM and the fraction by volume φM (or 1−φC) of the elastomeric composition different from the elastomeric composition of the composite material are defined such that the formula $$\frac{\alpha\beta}{[\phi C + (1 - \phi C)\alpha\beta][\phi C\alpha + (1 - \phi C)]}, \text{ in which } \alpha = E^T_C,$$

is less than 0.67.

16. The tread according to claim 12, wherein the layers of the elastomeric composition different from the elastomeric composition of the composite material have a thickness within a range extending from 1 to 20 mm.

17. The tread according to claim 1, wherein the layers of the plurality of layers are parallel to the equatorial plane.

18. The tread according to claim 17, wherein each of the layers of the plurality of layers is formed by the composite material.

19. A tire comprising a tread according to claim 1.

20. The tire according to claim 19, wherein the tire is a tire for civil engineering vehicles or heavy-duty vehicles.

* * * * *